3,232,978
PREPARATION OF ACRYLONITRILE
Yutaka Yasuhara and Akihisa Miyake, Ohtsu-shi, Shiga-ken, Japan, assignors to Toyo Rayon Kabushiki Kaisha, Tokyo, Japan, a corporation of Japan
No Drawing. Filed Nov. 30, 1962, Ser. No. 244,538
Claims priority, application Japan, Nov. 30, 1961, 36/42,637, 36/42,638
2 Claims. (Cl. 260—465.3)

This invention relates to a method of reacting with ammonia and molecular oxygen an olefin selected from the group consisting of propylene and isobutylene to prepare α,β-unsaturated nitriles having the same number of carbon atoms as said olefin. More particularly, the invention relates to a method of preparing the intended α,β-unsaturated nitriles in high yield and selectively by using in the aforesaid reaction a composite catalyst composition containing an oxide of vanadium (A) and at least one metallic oxide selected from the group consisting of the respective oxides of bismuth, tin, lead, and iron (B).

By using the catalyst composition according to this invention, it becomes possible to prepare in good yield acrylonitrile from propylene and methacrylonitrile from isobutylene.

Heretofore, many proposals have already been made concerning a method of preparing acrylonitrile by the so-called ammoxydation reaction in which propylene is reacted with ammonia and oxygen. For example, the Belgian Patent 571,200, the United States Patent 2,904,580, and the Japanese Official Gazette, Publication No. 5870/1961 have proposed a method of preparing acrylonitrile in high yield by employing a catalyst containing molybdic acid and a bismuth, tin, and antimony salt of molybdic acid. On the other hand, according to Belgian Patent 593,097, acrylonitrile is obtained from propylene by using as a catalyst titanium, manganese, iron, cobalt, nickel, copper, zinc, silver, fold, cadmium, tin, cerium, lead, bismuth, thorium, vanadium, niobium, tantalum, molybdenum, tungsten and the solid phosphoric acid activated by two or more of the former.

However, according to our experiments it was found that by these conventional methods the formation as by-products of acetonitrile and hydrogen cyanide occurred to some extent, making it exceedingly difficult to obtain the intended acrylonitrile in high purity. As the boiling point of acetonitrile is very close to that of acrylonitrile, for separating and removing the acetonitrile by the ordinarily practiced fractional distillation, it is without doubt a disadvantage from the industrial standpoint since there is required a distillation column having a great number of theoretical plates. There is also the drawback that not only is hydrogen cyanide highly toxic but also in that it forms a polymer upon being irradiated in the presence of water or ammonia and immediately colors the intended product. Particularly, in case of acrylonitrile for use in preparing synthetic fibers, since the requirement is for those which are of very high purity, it is especially desired that the formation of these by-products be restrained; in fact, it is obligatory.

Accordingly, having conceived of using oxides of vanadium as the catalyst we carried out experiments therewith. However, when propylene or isobutylene was reacted with ammonia and molecular oxygen while using as a catalyst a suitable carrier such as, for example, silica gel, carborundum, etc. which carried only an oxide of vanadium, besides the reaction for forming the intended acrylonitrile or methacrylonitrile, the following undesirable side reactions occurred at the same time, namely:

(a) The reaction in which is formed carbon monoxide and carbon dioxide by the combustion of the starting material olefin, i.e., the propylene or isobutylene.

(b) The reaction in which the bond between the carbons opens by reaction of the ammonia and molecular oxygen on the double bond side of the starting material olefin.

In consequence, hydrogen cyanide and acetonitrile were formed as by-products, and thus the experiment ended in a failure.

However, when a catalyst on whose carrier were supported an oxide of vanadium (A component) and at least one or more metallic oxides selected from the group consisting of the oxides of bismuth, tin, lead, and iron, respectively (B component), was employed in the ammoxydation reaction of propylene or isobutylene by means of the aforesaid ammonia and molecular oxygen, it was found that the aforesaid undesirable side reactions described in (a) and (b), above, were restrained, and the reaction as intended by the present invention, i.e., the reaction of converting the methyl group adjacent the double bond of the starting material olefin, occurring as the principal reaction, the intended acrylonitrile or methacrylonitrile could be prepared in high yield and purity without decreasing the number of atoms of the starting material olefin.

Accordingly, it is an object of the present invention to provide in preparing acrylonitrile by ammoxydation by reacting propylene with ammonia and molecular oxygen a method of preparing commercially with advantage and effectiveness fiber grade acrylonitrile of high purity by restraining to particularly an absolute minimum the formation of by-products.

Another object of this invention is to provide a novel catalyst which can be utilized with particular advantage in carrying out such a method.

Other objects and advantages of the present invention will be apparent from the description which follows.

The catalyst of the present invention is that in which the catalyst carrier is caused to support thereon:

(a) An oxide of vanadium (A component), and
(b) At least one metallic oxide selected from the group consisting of the oxides of bismuth, tin, lead, and iron, respectively (B component).

Further, according to this invention, to the catalyst carrier may be added, besides the aforesaid A and B components, (c) At least one oxide of a meta selected from the group consisting of phosphorous, boron, molybdenum, selenium, and tellurium.

While in the invention the use of the foregoing B component is effective in restraining the side reactions that have been described in items (a) and (b) in the earlier part of the specification, by the addition further of the foregoing C component the side reactions can be still more effectively restrained so as to make possible the improvement selectively of the reaction of forming the intended acrylonitrile or methacrylonitrile.

Accordingly, a catalyst of particular suitability for the present invention comprises that in which the three components of an oxide of vanadium, an oxide of iron and an oxide of bismuth, the first being the A component and the latter two the B component, are simultaneously dispersed and caused to be supported by a silica gel or Carborundum carrier to which is added further and caused to be copresent one or more oxides of the metals selected from the group consisting of phosphorus, boron and molybdenum.

Typical examples of the metallic oxides used as the catalyst include: as the oxides of vanadium, for example, vanadium trioxide and vanadium pentoxide; as the oxides of iron, for example, ferrous oxide, ferric oxide, and tri-iron tetroxide; as the oxides of bismuth, for example, bismuth trioxide, bismuth pentoxide, etc.; as the oxides of tin, stannous oxide and stannic oxide; and as the oxides of lead monoxide and lead dioxide, etc. On the other hand, as the oxides of phosphorus, for example, phosphorous pentoxide can be conveniently utilized; as the oxides of boron, boric oxide; and as the oxide of molybdenum, molybdenum trioxide, etc. Again, the oxides of selenium and tellurium which are used as the C component may be any so long as they are the oxides of these metals.

The methods per se that are employed in causing the catalysts to be supported by the carriers or in preparing the catalyst are not essentially concerned with the reaction. Hence, the catalyst of the present invention can be prepared by any of such known procedures such as the immersion technique, the coprecipitation technique, etc. For example, in accordance with the immersion technique the catalyst can be prepared by calcining at 400–700° C. a metallic oxide, the component of the catalyst which include the nitrates, carbonates, hydroxides, organic acid salts, ammonium salts, halides, oxides, volatile inorganic acid salts of metals or the acids containing these metallic atoms (e.g. vanadic acid, stannic acid, etc.) to obtain a compound in which other than the intended metallic atom and oxygen atom hardly anything remains and which is soluble in a solvent such as water, ammonia water, hydrogen peroxide, an inorganic acid such as nitric acid, or an organic acid, or organic solvents, etc., thereafter dissolving this compound in a suitable solvent given above, then effecting its absorption by a carrier, followed by drying and calcining at 400–700° C. On the other hand, when the immersion technique is not employed, the preparation can also be carried out, for example, by mixing the salts or oxides of metals which make up the catalyst component, as enumerated above, with a paste-like carrier, followed by molding and drying or by calcining after drying and thereafter screening to the appropriate particle sizes.

This invention also is hardly affected at all essentially by the state of oxidation, i.e., the type of oxides, of the metallic oxides which are the catalyst component. For example, in the case of the oxides of vanadium, it may be either $V_2O_3$ or $V_2O_5$, or the mixtures thereof. Taking the case of the oxides of vanadium as an example, this means that even though the start is with $V_2O_3$ alone or $V_2O_5$ alone, it is equally possible to render the componential composition into that of the present invention by suitable selection of the other conditions. This is believed to be due to the fact that when the reaction reaches its normal state the catalyst composition becames a state intermediate to that of $V_2O_3$ and $V_2O_5$. This likewise is the case with the other metallic oxides, i.e., the oxides of bismuth, tin, lead or iron. Therefore, so long as the catalyst of this invention is an oxide of these metals, it can be used without regard to its state of oxidation. However, for reasons such as that inherent in the method of preparing the catalyst and others, that whose oxidation is most advanced, for example, in the case of vanadium, vanadium pentoxide, is normally employed.

As described hereinabove, the present invention is hardly affected at all essentially by the state of oxidation of the catalyst composition. Instead, it is affected to a greater extent by the concentration with respect to the carrier of the metallic atom of these catalyst compositions. Namely, when the carrier is, for example, represented by $(SiO_2)W$ or $(SiC)W$ and the metallic vanadium of the oxides of vanadium is represented by V, according to the present invention a molar ratio of W:V=100:1–20 is used, a W:V of about 100:10 being particularly desirable. When the oxides of bismuth, tin, lead or iron that are to be added in the present invention are each added singly, the preferred proportions on a molar basis of each, based on the metals of these metal oxides, are as follows when V=1: namely, Bi=0.5–5, preferably 0.5–2; Sn=1–20; Pb=0.2–5, preferably 0.2–2; and Fe=0.5–1.0, preferably 0.5–5.

Again, according to the present invention, when as the C component the oxides of phosphorus, boron, molybdenum, selenium or tellurium are to be added, the addition at the following rates on a molar basis to 10 atoms of vanadium are preferred, on the basis of the metallic vanadium contained in the case of the oxide of vanadium and the respective metals in case of the aforesaid C components:

Phosphorus _____ 0.5–10
Boron _____ 0.5–10
Molybdenum _____ 1–10
Selenium _____ 1–10
Tellurium _____ 1–10

Further, when as the B and C components two or more of the metallic oxides of each are to be used concurrently, generally the proportion in which the total quantity becomes the same ratio to the metallic oxides of vanadium as in the case when one kind is used, as described above, is satisfactorily used.

The catalyst of the present invention, as described hereinbefore, is prepared as follows: The two components of A and B or the three components of A, B and C in the form of salts of these metals which are soluble in such as water, ammonia, hydrogen peroxide, inorganic acids, organic acids, or organic solvents are caused to adhere to the carrier by any of the heretofore-known means such as, for example, the immersion technique, the coprecipitation technique, etc. Then, with or without drying, the catalyst-adhered carriers are calcined finally at about 400–700° C. thereby rendering the foregoing components into the oxides of these metals and causing them to be supported by the carriers.

Besides silica gel, Carborundum, etc., numerous other known carriers can be used such as activated alumina, pumice, diatomaceous earth, etc.

The preparation of acrylonitrile from propylene or methacrylonitrile from isobutylene by using the catalyst composition according to the present invention may be conveniently carried out by catalytically reacting in the vapor phase at high temperature propylene or isobutylene with ammonia and molecular oxygen in the presence of said catalyst composition.

The reaction is suitably carried out at a temperature of 350–600° C., preferably 390–480° C., a pressure of not more than 50 kg./cm.³, preferably atmospheric to 5 kg./cm.³, and a catalytic reaction time of 0.1–100 seconds, preferably 1–10 seconds. The optimum conditions are determined in consideration of the compoistion of the catalyst and other factors.

As the foregoing molecular oxygen, air can be used, it being most economical. Again, according to the invention, as a diluent gas an inert gas such as nitrogen, propane, ethane, methane, argon, carbon dioxide and steam may be introduced into the reaction system, and in most cases the employment of these inert gases generally brings about favorable results. Steam is particularly to be preferred as it not only is useful as a diluent gas, but also because it is effective in checking the lowering of catalytic activity. However, the employment of these inert gases has nothing to do with the essence of the present invention, and hence it should be understood that the invention is not limited to the use of these inert gases. The starting material olefin may also contain a low molecular paraffin gas. In this case, the paraffin merely becomes a diluent and does not adversely affect the reaction.

Although the molar ratio of the material olefin, ammonia, oxygen and inert gas which are to be fed will be decided in the final analysis by such as the catalytic reaction apparatus and technique to be used and economic consideration, the range in which to 20 of oxygen, olefin=3–35, ammonia=3–35 and steam=0–120 is suitable. To this can be additionally fed on a molar basis of 0–200 such inert gases as nitrogen, propane, ethane, methane, argon, etc. Again, while it is possible use olefin and ammonia in the range in which on a molar basis the former is one to 0.3–3 of the latter, at times it is preferable to use a somewhat excess of ammonia in the neighborhood of its stoichiometric quantity.

As the reaction apparatus and the technique to be used in carrying out this invention, any of the conventional tenchniques that are generally used in vapor phase oxidation can be employed. Namely, either the continuous process or the batch process may be used. And while either the fixed bed using small spheroidal particles or the moving bed can be employed, the fluidized bed technique which has the advantage that strict control of the reaction temperature is possible is of greater advantage. Therefore, the method to be most preferred is that in which the reaction is effected continuously by the fluidized bed technique, and in which the unreacted material is recycled and used for a prescribed period of time and the catalyst whose activity has decreased is effected contact with high temperature and air and regenerated. However, it is not intended to limit this invention to this technique.

Next, when the effects of the reaction temperature in the method of the present invention is examined, it is seen the reaction rate of the material increases as the temperature rises. At first, a peak in the formation of hydrogen cyanide exists at a relatively low temperature. Then it monotonously decreases. Next, appears the peak in the formation of acrylonitrile, and at a still higher temperature the rate of formation of acetonitrile reaches its maximum. Therefore, by means of a suitable reaction temperature range it becomes possible to obtain a maximum rate of formation of acrylonitrile per one pass through the catalytic layer of the material mixed gas while moreover holding to a minimum the formation of acetonitrile and hydrogen cyanide. As such a temperature range, that, as already mentioned hereinbefore, of 350–600° C., preferably 390–480° C., is satisfactory.

The contact time also shows a similar tendency as in the case of the reaction temperature, the suitable range in which most desirable results are obtained being normally when 0.1–100 seconds, preferably 1–10 seconds, are used.

In separating and purifying the product obtained by the method of this invention from the unreacted material and by-products, those methods generally employed in case of vapor phase oxidation such as washing by means of cold water or organic solvents, separation, fractional distillation and extraction may be applied.

While we have described the nature of the present invention in detail hereinbefore, it is to be understood that the catalyst composition of this invention is not intended to be limited to only the use of the aforesaid two components comprising the A and B components or the aforesaid three components comprising the A, B, and C components, but besides these metallic oxides, by adding a small quantity of those other metals or metallic compounds which have been known in the past as catalysts for use in the catalytic reaction in preparing acrylonitrile or methacrylonitrile by reacting propylene or isobutylene with ammonia and molecular oxygen, the catalyst composition of the present invention can be modified. However, it is to be understood that these modifications come within the scope of this invention.

To further illustrate the present invention and advantages thereof, the following examples are given, it being understood that these are merely intended to be illustrative and not in limitation of the invention.

Example 1

The operation of impregnating 200 grams of commercially available silica gel, which was graded beforehand to particles of 100–200 mesh, with an aqueous ammonia solution saturated with ammonium metavanadate ($NH_4VO_3$) followed by drying was repeated until finally 39 grams of ammonium metavanadate was impregnated into the 200 grams of silica gel. After this was dried at 150° C., it was calcined at 450–500° C. for 6 hours and thereafter passed through a sieve of 100–200 mesh. To 200 grams of the so obtained silica gel-vanadium pentoxide (I) was added 153.4 grams of stannous chloride ($SnCl_2 \cdot 2H_2O$) and impregnated therein. This was then dried for 2 hours at 150° C., and after converting the hydrochloric acid into ammonium chloride with ammonia water, it was dried aagin, after which it was calcined in a well-ventilated electric oven at 500° C. for 6 hours and thereafter again passed through a sieve of 100–200 mesh.

140 grams of the catalyst obtained as above was placed in a Telex fluidized bed reaction tube 500 mm. in length and 35 mm. in diameter. To this was then introduced such that the contact time would be 2 seconds a gas of the following molar proportions after having been passed through a preheater of 150° C.

Composition of gas: Propylene 1.0, ammonia 1.0, air 7.5, steam 1.0.

At a reaction temperature of 480° C., reaction results, as given below, were observed by means of gas chromatography and titration.

Reaction rate of the starting material: Ammonia 67%, propylene 53%.

Rate of conversion to products on the basis of the propylene fed: Acrylonitrile 22%, acetonitrile 9%, hydrogen cyanide 9%.

When a gas of the following composition was reacted with the same catalyst at a reaction temperature of 540° C., the results obtained were as follows.

Composition of gas: Propylene 1.5, ammonia 1.0, air 7.5, steam 1.0.

Reaction rate of the starting material: Propylene 56%.

Rate of conversion to products on the basis of the propylene fed: Acrylonitrile 23%, acetonitrile 13%.

Example 2

A catalyst was prepared by impregnating the silica gel-vanadium pentoxide (I) prepared by the same procedures as in Example 1 with 38.4 grams of stannous chloride likewise by the same procedures as in Example 1.

Using 150 grams of the foregoing catalyst and employing the same reaction apparatus as in Example 1, a gas of the following composition was reacted at a reaction temperature of 480° C. for a contact time of 2 seconds.

Composition of gas: Propylene 1.3, ammonia 1.0, air 7.5, steam 1.0.

The results obtained were as follows.

Reaction rate of the starting materials: Ammonia 69%, propylene 49%.

Rate of conversion to products on the basis of the propylene fed: Acrylonitrile 16%, acetonitrile 6%, hydrogen cyanide 5%.

Example 3

A catalyst was prepared by a similar method as in Example 2, using 200 grams of a 100–200 mesh silica gel, 78 grams of ammonium metavanadate 324 grams of bismuth nitrate, 540 grams of ferric nitrate and 8.3 grams of boric acid ($H_3BO_3$).

Using this catalyst, the reaction was carried out for 4 hours at 420° C. by introducing propylene at the rate of 300 ml. per minute, ammonia at 200 ml. per minute, air at 1500 ml. per minute and steam at 200 ml. per minute.

When the reaction gas was analyzed, the following results were obtained.

Reaction rate of the starting materials: Propylene 43%, ammonia 50%, oxygen 32%.

Rate of conversion to products on the basis of the propylene fed: Acrylonitrile 7.6%, acetonitrile not more than 0.5%, hydrogen cyanide 1.6%.

9.1 grams of organic matter was captured in a trap cooled with Dry Ice-methanol, which, when analyzed, was found to have the following composition: Acrylonitrile 94.5%, acetonitrile 1.9%.

*Example 4*

A catalyst was prepared following procedures similar to that employed in Example 2 and using 200 grams of 100–200 mesh silica gel, 78 grams of ammonium metavanadate, 357 grams of bismuth nitrate, 540 grams of ferric nitrate and 6.1 grams of boric acid. When a reaction was carried out for 4 hours using this catalyst under conditions identical to that of Example 8, the following results were obtained.

Reaction rate of the starting materials: Propylene 47%, ammonia 61%, oxygen 81%.

Rate of conversion to products on the basis of the propylene fed: Acrylonitrile 15.9%, acetonitrile 0.6%, hydrogen cyanide 2.3%.

19.4 grams of organic matter captured in the trap had the following composition: Acrylonitrile 83.8%, acetonitrile 2.8%.

On the other hand, when the reaction temperature was made 460° C., the results obtained were as follows.

Reaction rate of the starting materials: Propylene 51%, ammonia 62%, oxygen 93%.

Conversion rate to products on the basis of the propylene fed: Acrylonitrile 22.1%, acetonitrile 1.0%, hydrogen cyanide 1.2%.

What is claimed is:

1. A method of preparing acrylonitrile which comprises catalytically reacting propylene with ammonia and molecular oxygen for 0.1–100 seconds at a temperature of 350–650° C. and a pressure of atmospheric to 50 kg./cm.$^2$, in the presence of a catalyst composition consisting essentially of (A) vanadium oxide, (B) an iron oxide selected from the group consisting of ferric and ferrous oxides, (C) bismuth oxide, and (D) boron oxide, all in combination, supported on a carrier.

2. The method in accordance with claim 1 wherein said carrier is selected from the group consisting of silica gel, Carborundum, activated alumina, pumice, and diatomaceous earth.

References Cited by the Examiner
UNITED STATES PATENTS

| | | | |
|---|---|---|---|
| 2,481,826 | 9/1949 | Cosby | 260—465.3 |
| 2,805,244 | 9/1957 | Gabbett et al. | 260—465.3 |
| 2,809,987 | 10/1957 | Fierce et al. | 260—465.3 |
| 2,820,812 | 1/1958 | Lichtenberger et al. | 260—465.3 |
| 2,830,026 | 4/1958 | Shapiro | 252—432 |
| 2,938,001 | 5/1960 | Rosset | 252—432 |
| 3,009,943 | 11/1961 | Hadley et al. | 260—465.3 |
| 3,086,041 | 4/1963 | Hadley et al. | 260—465.3 |
| 3,135,783 | 6/1964 | Sennewald et al. | 260—465.3 |
| 3,142,697 | 7/1964 | Jennings et al. | 260—465.3 |

FOREIGN PATENTS

| | | |
|---|---|---|
| 635,328 | 1/1962 | Canada. |
| 636,191 | 2/1962 | Canada. |
| 1,255,121 | 1/1961 | France. |
| 1,269,382 | 7/1961 | France. |

OTHER REFERENCES

Berkman et al.: "Catalysis," 1940, pages 438, 767, 769.

Knapsack: Derwent Belgian Patent Report No. 76–B; June 30, 1961, p. A13.

Kogyo: Derwent Belgian Patent Report No. 66–A; July 15, 1960; p. A23.

CHARLES B. PARKER, *Primary Examiner.*

JOSEPH P. BRUST, *Examiner.*